United States Patent Office 2,756,215
Patented July 24, 1956

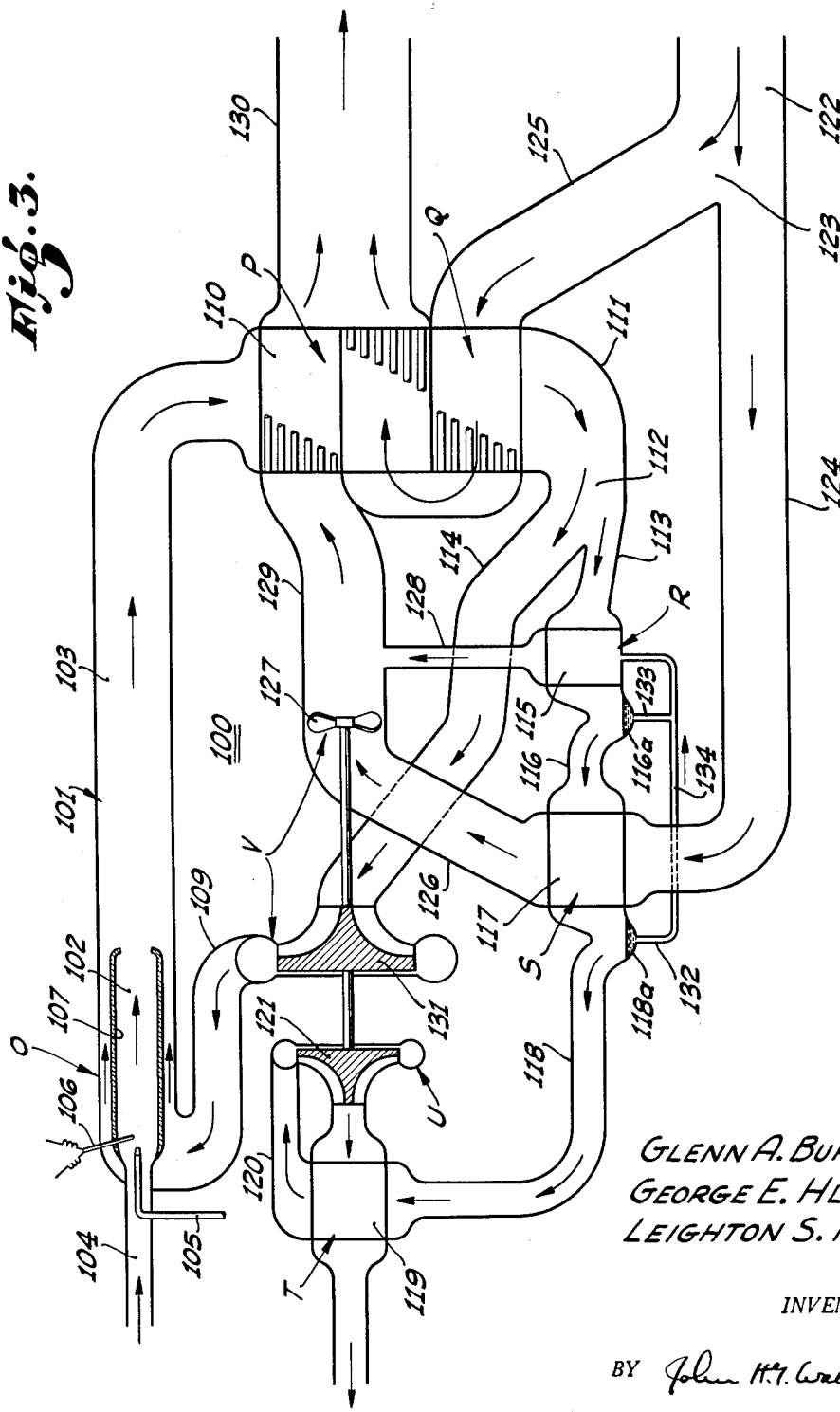

2,756,215

METHOD OF PREPARING A SUBSTANTIALLY DRY INERT GAS USEFUL FOR INERTING SPACES

Glenn A. Burgess, Lynwood, and George E. Hlavka and Leighton S. King, Los Angeles, Calif., assignors to The Garrett Corporation, Los Angeles, Calif., a corporation of California Application August 2, 1950, Serial No. 177,322

10 Claims. (Cl. 252—372)

This invention relates to the production and use of inert gases for inerting spaces and more particularly relates to a method for the continuous production of dry non-combustible gases to purge and inert the fuel tanks and fuel bays of aircraft. The invention will be herein disclosed as embodied in a system for producing non-combustible gases by the burning of air and hydrocarbon fuel.

One of the ever present perils incident to the operation of present day aircraft is the possibility of the occurrence of fires and explosions in the fuel tanks and in the spaces surrounding them. The fuel used in aircraft is generally a hydro-carbon fuel having a relatively high vapor pressure and is capable of forming combustible mixtures with the oxygen of the air. Under the greatly differing conditions of ambient atmosphere which occur in flight, there is considerable possibility that such combustible mixtures will be formed, and the difficulties of making certain that a combustible mixture will not be formed at any time become very considerable. Due to the very high temperatures generally prevailing aboard and about high speed jet aircraft, it is absolutely imperative that some system for purging dangereous vapors be provided for this type of aircraft. For other types of aircraft, though possibly not so imperative, it is extremely desirable if a high standard of safety is to be maintained.

Although our invention will be described in connection with the inerting of spaces in aircraft, it is obviously not limited to use in aircraft. It is believed to be adaptable to almost any situation where a continuous supply of inert gas is required. Thus, with slight modification, which does not depart from its scope, it may be used for providing the inert storage atmospheres needed in chemical plants and refineries. It may also be used to provide inerting facilities during transportation by land or water. Due to its general applicability other instances where it can be used are numerous.

It is accordingly an object of the invention to provide a system for inerting spaces in general, including terrestrial spaces, marine spaces and spaces aboard aircraft.

It is another object of the invention to reduce the peril of aircraft operation incidental to the carrying of fuel.

It is a further object of the invention to provide a method suitable for use in aircraft for producing relatively inert gases.

It is a further object of the invention to provide a method suitable for use in aircraft for producing inert gaseous mixtures.

It is another object of the invention to provide a method for inerting the spaces of fuel tanks and fuel bays in aircraft.

It is a further object of the invention to provide a method suitable for use in aircraft for producing inert gaseous mixtures through the combustion of air and fuel.

It is a further object of the invention to provide a method suitable for use in aircraft for producing relatively dry non-combustible gases.

It is a further object of the invention to provide a method suitable for use in aircraft for continuously producing relatively inert gases, rendering them free of moisture, and delivering them at the proper temperature to the fuel tanks and fuel bays of aircraft.

It is a further object of the invention to provide a method suitable for use in aircraft for producing relatively inert gases by the combustion of fuel and air at a high temperature, and cooling and drying the gases so produced to render them suitable for inerting the fuel tanks and fuel bays of aircraft.

It is a further object of the invention to provide a method suitable for use in aircraft for producing relatively inert gases by the combustion of fuel and air in a combustion chamber at a high temperature, the gas so produced being cooled and a portion of such cooled gas being recirculated to provide cooling for the combustion reaction.

It is a further object of the invention to provide a method suitable for use in aircraft for producing relatively inert gases by the combustion of fuel and air in a combustion chamber at a high temperature, wherein the gas so produced is cooled and a portion of the cooled gas is recirculated to a mixing chamber and mixed therein with hot gases.

It is a further object of the invention to provide a vide a method suitable for use in aircraft for producing relatively inert gases by the combustion of fuel and air, wherein wet, relatively warm gases pass in heat exchange with dry, relatively cool gases.

It is a further object of the invention to provide a method suitable for use in aircraft for producing relatively inert gases by the combustion of fuel and air, wherein the gases are cooled to a comparatively low temperature so as to raise their relative humidity and render them more easily dried through physical means.

It is a further object of the invention to provide a method suitable for use in aircraft for producing relatively inert gases by the combustion of fuel and air, wherein the gases so produced are cooled by passing through a plurality of cooling stages, including an expansion turbine, to produce a dry inert gaseous mixture which is conducted to the spaces to be inerted.

These and other objects are effected by our invention, as will be apparent from the following description and claims taken in connection with the accompanying drawings, in which:

Figure 3 is a schematic diagram of a third embodiment of our purge gas generating and inerting system.

Broadly our invention is directed to insuring an inert atmosphere in spaces in general and in particular in the spaces of fuel tanks and fuel bays of aircraft, through the combustion of air and fuel to produce inert gases which are cooled, dried and conducted continuously to the spaces to be inerted. In brief, our invention includes a combustion stage wherein the inert gases are produced; a mixing stage wherein the gases so produced are mixed with cooled gases which have been recirculated to the combustion zone; a number of cooling stages wherein the gases may be cooled, by heat exchange with ram air, by heat exchange with dry purge gases, by evaporative cooling, and by being passed through an expansion turbine; one or more water separatory stages; and an arrangement for transferring the energy produced in the expansion turbine to a circulatory system for the circulation of coolant air and for the recirculation of a portion of the cooled gases for cooling and mixing in the combustion zone.

Figure 1:
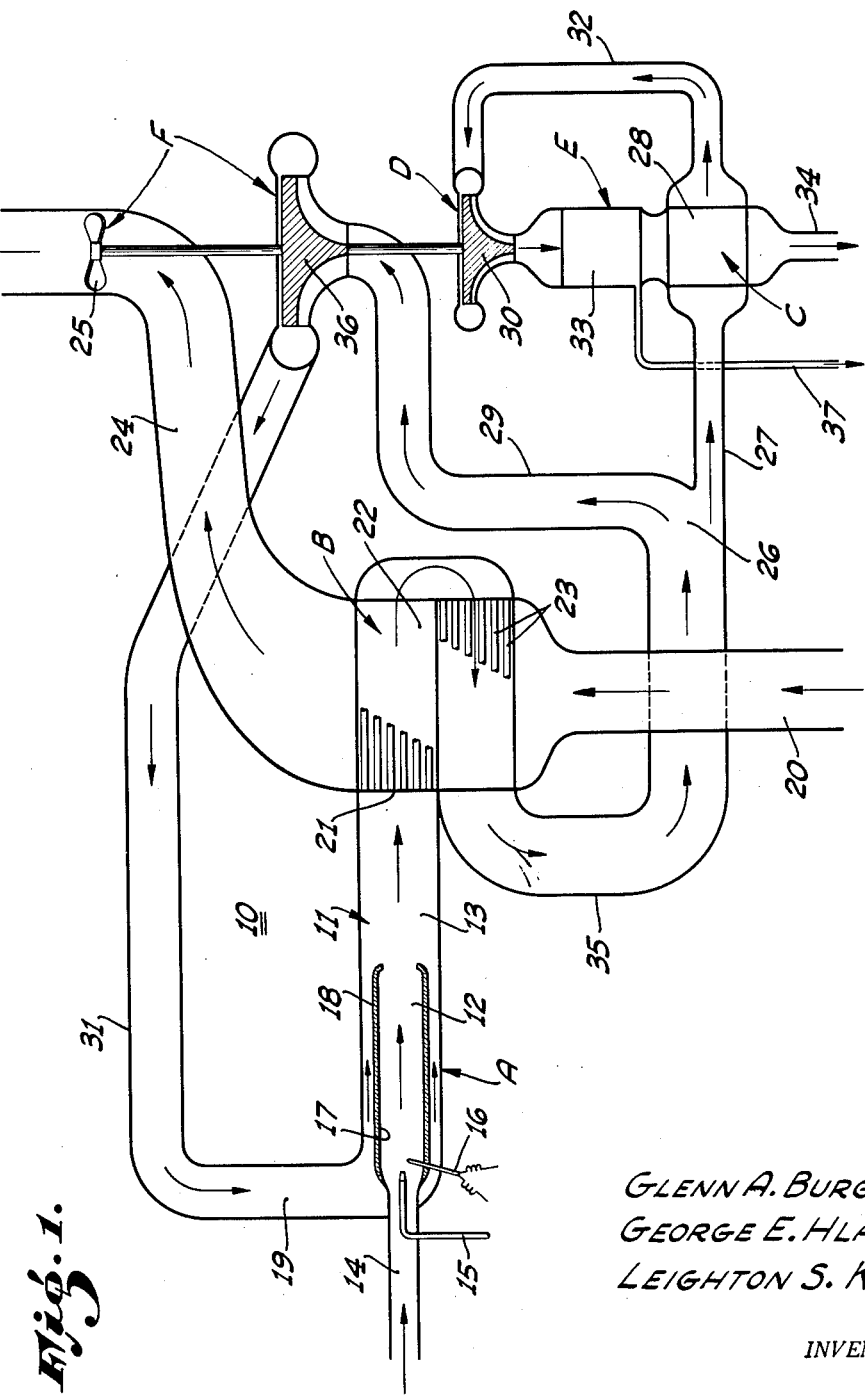
Figure 1 is a schematic diagram of one embodiment of our purge gas generating and inerting system.

Referring to Figure 1, there is shown a schematic diagram of one embodiment of our gas generating and inerting system. In this diagram the numeral 10 generally designates a system which includes a combustion stage A, a first cooling stage B, a second cooling stage C, a third cooling stage D, a drying stage E and a circulatory system F.

In accordance with this embodiment of our system, compressed air, from a source not shown, such as air from a jet engine compressor or the high pressure gases from the engine combustion chamber is introduced through compressed air inlet 14 into a combustion zone 11, which zone includes combustion chamber 12 and a mixing chamber 13. Fuel is injected into the combustion chamber 12 through the fuel inlet 15 to form a combustible mixture with the air. The mixture which, under normal operating conditions is nearly stoichiometric, is then ignited by means of an ignition plug 16 or other conventional electrical means, to cause complete combustion between the fuel and air. With combustion a hot gaseous mixture of carbon dioxide, nitrogen, small amounts of carbon monoxide, trace amounts of oxygen and water is produced, and the temperature within the combustion chamber 12 rises to about 4000° F. It is necessary therefore that the burning mixture be retained inside metal flame retaining walls 17 which may be ceramic coated as particularly indicated at 18.

For cooling purposes cooled gases are recirculated to the combustion chamber 12 by way of the conduit 31 and the recirculating gas inlet 19, and pass around the outside of the flame retaining walls 17 and thence to the mixing chamber 13.

In order to permit utilization of conventional heat exchanger design the maximum temperature of gases at the heat exchanger inlet 21 of the first cooling stage must be maintained considerably below the temperature at which they leave the combustion chamber 12. Therefore, a mixing stage is provided wherein the hot gases leaving the combustion chamber 12 and passing into the mixing chamber 13, as previously indicated, are mixed in the chamber 13 with the recirculating cool gases which already have passed around the outside of the flame retaining walls 17 of the combustion chamber 12. By means of this mixing the temperature of the gases is reduced from about 4000° F. to about 1800° F. before they enter the heat exchanger 22 of the first cooling stage.

The gaseous mixture of combustion products are now further cooled in the heat exchanger 22 from a temperature of about 1800° F. to a temperature of about 330° F., by bringing them into contact with heat transfer surfaces generally designated at 23, which reject heat to a cooling fluid which in most instances will be ram air. The ram air for cooling is drawn in the usual manner from the ambient air surrounding the aircraft into duct 20 and is circulated through the heat exchanger 22 and out the cooling air outlet 24 by means of the circulating fan 25 which is driven by the expansion turbine 30 of the third cooling stage, in a manner to be more particularly explained.

The gaseous mixture leaving the heat exchanger 22 of the first cooling stage is now conducted through the air conduit 35 to the Y 26 where a smaller portion is allowed to pass through conduit 27 into the reheater 28 of the second cooling stage; and a larger portion is allowed to pass through the blower conduit 29 to a blower 36 which recirculates this larger portion through the recirculating conduit 31 to the combustion chamber 12 and thence to the mixing chamber 13 for the cooling and mixing purposes previously described.

Within the reheater 28 of the second cooling stage the gaseous mixture is further cooled by regenerative heat exchange with the relatively inert gases passing into the reheater 28 from a water separator 33. The cooling within the reheater 28 of the second cooling stage is fairly slight, being from about 330° F. to about 310° F., and it is incidental to the warming of dry gases to cause an evaporative effect upon them, as will be more particularly explained. The gaseous mixture leaves the reheater 28 and passes through the conduit 32 and into the expansion turbine 30, where it is further cooled by expansion in the turbine from a temperature of about 310° F. to a temperature of about 50° F.

In order to provide for the necessary transfer of energy obtained in the expansion of the gases in the expansion turbine 30, the turbine is made to drive the blower 36 for recirculating the cooled gases back to the combustion chamber 12, and the fan 25 for circulating the cooling fluid or ram air through the heat exchanger of the first cooling stage, as has been previously explained.

The gaseous mixture which has now undergone three stages of cooling will, under most circumstances, contain considerable moisture upon leaving the turbine; this moisture resulting from the formation of $H_2O$ in the combustion reaction as previously indicated. In order to reduce its moisture content, the gaseous mixture is now passed through the water separator 33, which may consist of glass wool or other substance suitable for causing coalescence and drop formation in such a way that water droplets can be removed through a suitable drain 37.

The relatively dry gaseous mixture passing out of the water separator 33 with only a small amount of moisture remaining now passes into the reheater 28 of the third cooling stage, where as previously indicated it serves to slightly cool warmer gases before they pass to the expansion turbine 30. In so doing, the relatively dry gaseous mixture is itself heated by contact with the heat transfer surfaces receiving heat from the warmer wet gases, and any moisture remaining is evaporated. The gaseous mixture now passes out the reheater outlet 34 and is delivered at a temperature of about 120° F., and in a substantially dry state, to the areas to be inerted.

Suitable controls for the system are well known in principle and are therefore not shown in the diagram. In general, they will consist of suitable electrical and/or pneumatic devices for maintaining the correct proportionality between fuel flow and air flow, and may be made as simple as possible, consistent with the performance requirements of the system. Items which should be included in the control system in a given instance include the recirculation rate, purge flow rate, and possible water separation controls. It is also essential to provide controls to stop fuel and air flow if the flame in the combustion chamber is extinguished for any reason. Where the pressure of the space to be inerted is stable, i. e., does not fluctuate rapidly, a ratio control which maintains pressure at the turbine inlet proportional to the inerted space pressure is a one means of controlling air flow. This type of control will permit fluctuation of compressed air delivery pressure within certain limits without affecting air flow or purge gas flow in the system. In this control a conventional pneumatic sensing device containing a diaphragm, spring and bellows arrangement may be employed to modulate a butterfly valve upstream of the turbine. Metering of fuel in proportion to air flow can be obtained by a similar control which maintains fuel pressure proportional to inerted space pressure. Then if both fuel flow and air flow are made proportional to space pressure, they will be automatically proportioned to each other and the desired mixture will be obtained.

The temperature condition in the various stages of the system recited in the above are illustrative only of one set of conditions under which our system will function. No further reference will be made to temperature in the succeeding description as it is clear that these conditions will differ with differing requirements in a given instance.

Figure 2:
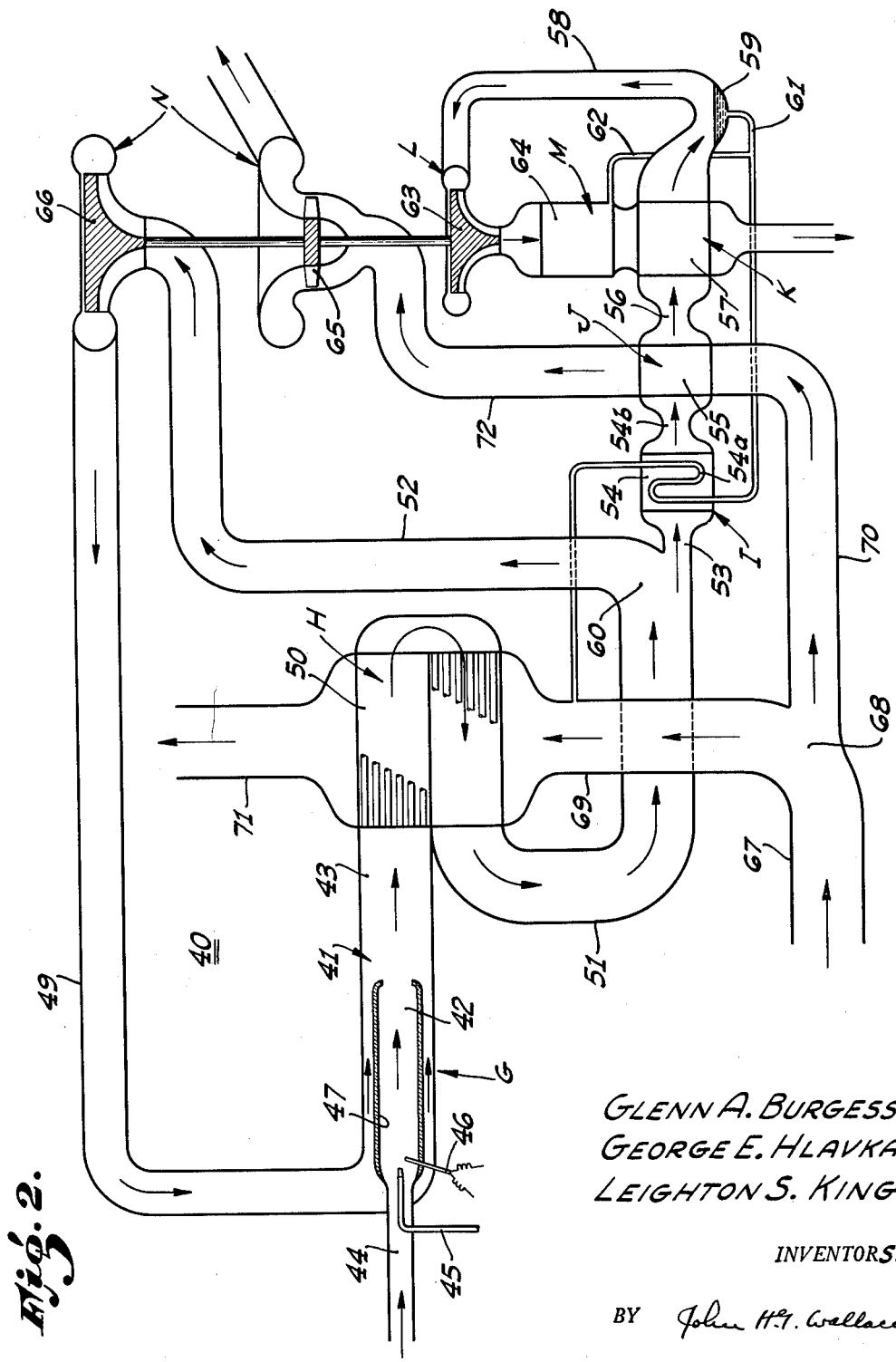
Figure 2 is a schematic diagram of a second embodiment of our purge gas generating and inerting system.

Referring to Figure 2, there is shown a schematic diagram of a second embodiment of our purge gas generating and inerting system. In this diagram the number 40 generally designates a system which includes a combustion stage G, a first cooling stage H, a second cooling stage I, a third cooling stage J, a fourth cooling stage K, a fifth cooling stage L, a drying stage M, and a circulatory system N.

Our second embodiment differs from our first in providing for the division of coolant ram air into two portions, one of which passes through the heat exchanger of a first cooling stage as in our first embodiment, and a second which passes through a secondary heat exchanger of a third cooling stage, which was not part of our first embodiment; in the provision of an evaporator of a fourth cooling stage; and in the provision for additional water removal by means of a trap in the conduit between the reheater and the expansion turbine, with introduction of the removed water into the evaporator.

In accordance with this second embodiment of our system, compressed air from a source not shown, such as the air from a jet engine compressor or the high pressure gases from an engine combustion chamber, is introduced through a compressed air inlet 44 into a combustion zone 41, which zone includes a combustion chamber 42 and a mixing chamber 43. Fuel is injected into the combustion chamber 42 through a fuel inlet 45 to form a combustible mixture with the air. The mixture is then ignited by means of an ignition plug 46 to cause a complete combustion between the fuel and air. For cooling the combustion chamber, cooled gases are recirculated to it by way of conduit 49, and pass around the outside of the flame retaining walls 47 and thence to the mixing chamber 43.

As previously outlined in the description of our first embodiment, the hot gases leaving the combustion chamber 42 and passing into the mixing chamber 43 are mixed in the chamber with the recirculating cooled gases which have already passed around the outside of the flame retaining walls 47. By this mixing there is produced a gaseous mixture of considerably reduced temperature.

The gaseous mixture now leaves the mixing chamber 43 and passes into the heat exchanger 50 of the first cooling stage, where it is further cooled by heat exchange with ram air in the same manner as has been fully described for our first embodiment. Ram air which is used for cooling both the heat exchanger 50 of the first cooling stage and the secondary heat exchanger 55 of the third cooling stage enters through the conduit 67 and is divided in the Y 68, the larger portion passing directly through the conduit 69 to and through the heat exchanger 50 of the first cooling stage and out the outlet conduit 71. The smaller portion of the ram air is drawn through the conduit 70, the heat exchanger 55 of the third cooling stage and the conduit 72 by means of the fan 65.

The gaseous mixture leaving the heat exchanger 50 of the first cooling stage is now conducted through the conduit 51 to the Y 60 where a larger portion is allowed to pass through the blower conduit 52 to a blower 66, which recirculates this larger portion through the recirculating conduit 49 to the combustion chamber 42, and then to the mixing chamber 43 in the same manner as has been previously described in connection with our first embodiment; and a smaller portion is passed through a conduit 53 to an evaporator 54 of the second cooling stage.

Within the evaporator 54 of the second cooling stage the heat of the gaseous mixture causes the vaporization of water passing through the cooling coils 54a and the gaseous mixture is itself slightly cooled thereby. The steam exhausts through the coils 54a into the ram air inlet 69 to augment the cooling effect of the ram air, and is conducted with the coolant air through the heat exchanger 50 and out the coolant air outlet 71.

From the evaporator 54 of the second cooling stage the gaseous mixture is conducted through conduit 54b into a secondary heat exchanger 55 of the third cooling stage where it is further cooled by ram air drawn through the heat exchanger 55 by the fan 65 as previously explained.

Leaving the secondary heat exchanger of the third cooling stage the gaseous mixture passes through conduit 56 into a reheater 57 of the fourth cooling stage where it passes in heat exchange with the cooled, expanded gaseous mixture leaving the water separator 64. It then passes through the conduit 58 which connects the reheater 57 and the turbine 63.

Within the conduit 58 between the reheater 57 and the expansion turbine 63 there is provided a water trap 59 which under the temperature and humidity conditions existing for the gaseous mixture at this point, serves to trap out a considerable amount of water. This water together with the water leaving the water separator 64 through drain 62 is conducted through pipe 61 to the coils of the evaporator 54 where it is heated by the relatively hot gases leaving the heat exchanger of the first cooling stage and is thereby vaporized and then exhausted into the ram air entrance conduit 69 in the manner previously explained.

Following removal of water by means of the trap 59 in conduit 58 the gaseous mixture passes through conduit 58 into expansion turbine 63 where it is still further cooled.

The method for providing the necessary transfer of energy in the expansion of the gaseous mixture in the turbine 63 is the same as that described in our first embodiment, the turbine 63 being made to drive the blower 66 for recirculating cool gases back to the combustion chamber 42, and to drive the fan 65 for recirculating ram air through the secondary heat exchanger 55 of the third cooling stage.

The expanded gaseous mixture from the turbine 63 now undergoes a separatory stage in the water separator 64 identical with that described in our first embodiment and then passes through the reheater 57 to be further dried in a manner which is identical to this step in our first embodiment.

The gaseous mixture now passes out of the reheater 61 and is delivered at a proper temperature and in a dry state to the spaces to be inerted.

Referring to Fig. 3, there is shown a schematic diagram of a third embodiment of our purge gas generating and inerting system. In this diagram the numeral 100 generally designates a system which includes a combustion stage O, a first cooling stage P, a second cooling stage Q, a third cooling stage R, a fourth cooling stage S, a fifth cooling stage T, a sixth cooling stage U, and a circulatory system V.

Our third embodiment is similar to our second embodiment but differs from our first in providing for a division of coolant ram air into two portions, in providing for an evaporative cooling stage and in providing for the recirculation of removed water to the evaporator. It differs from both our first and second embodiments in using a portion of ram cooling air twice by passing the ram air leaving a secondary heat exchanger of the fourth cooling stage through a primary heat exchanger of the first cooling stage, and in providing for sufficient water removal without the use of a separate coalescing water separatory stage.

In accordance with this third embodiment of our system, the combustion of fuel and air and the mixing of cooled recirculated gases with hot gases leaving the combustion chamber, are carried out in the same manner as already described in connection with our first and second embodiments. Thus, compressed air is introduced through a compressed air inlet 104 into a combustion zone 101, which zone includes a combustion chamber 102 and a mixing chamber 103. The fuel is injected into the combustion chamber 102 through a fuel inlet 105, to form a combustible mixture. The mixture is then ignited by means of an ignition plug 106 to cause a complete combustion between the fuel and air. Cooled gases are recirculated to the combustion chamber 102 by way of conduit 109 and pass around the outside of the flame retaining walls 107 and thence to the mixing chamber 103.

The hot gases leaving the combustion chamber 102 and passing into the mixing chamber 103 are mixed in the chamber with recirculated cooled gases, and by this mixing there is produced a gaseous mixture of considerably reduced temperature.

The gaseous mixture now leaves the mixing chamber 103 and passes into a primary heat exchanger 110 which, as illustrated in the diagram consists of two portions which allow for two separate cooling stages. In the portion of the primary heat exchanger adjacent the gaseous mixture inlet, the gaseous mixture is cooled by heat exchange with ram air which has already passed through the secondary heat exchanger 117 of the fourth cooling stage; and, in the portion of the primary heat exchanger 110 adjacent the gaseous mixture outlet, the mixture passes in heat exchange with fresh ram air. The ram air for cooling enters through the conduit 122 and is divided in the Y 123, a larger portion passing directly through the conduit 125 to and through the portion of the primary heat exchanger 110 adjacent its gaseous mixture outlet and out the conduit 130; and a smaller portion being drawn by means of the fan 127 through the conduit 124, the secondary heat exchanger of the fourth cooling stage, the conduits 126 and 129, the portion of the primary heat exchanger adjacent its gaseous mixture inlet, and the conduit 130.

The gaseous mixture leaving the second cooling stage of the primary heat exchanger 110 is now conducted through the conduit 111 to a Y 112 where a larger portion is allowed to pass through the blower conduit 114 to a blower 131 which recirculates this larger portion through the recirculating conduit 109 to the combustion chamber 102 and then to the mixing chamber 103 in the same manner as has been previously described in connection with our first and second embodiments. A smaller portion of the gaseous mixture is passed through a conduit 113 to an evaporator 115 of the third cooling stage.

Within the evaporator 115 of the third cooling stage, heat of the gaseous mixture causes the evaporization of water passing through the cooling coils of the evaporator which are not shown, and the gaseous mixture is itself slightly cooled thereby. The water passing through the customary coils of the evaporator is water which has been removed from the gaseous mixture in subsequent stages and recirculated in a manner to be more particularly explained. The evaporated water or steam exhausts from the evaporator 115 through the steam outlet 128 into the ram air inlet 129 to the first cooling stage of the primary heat exchanger 110 to augment the cooling effect of the ram air, and is conducted with the coolant ram air through the first cooling stage of the heat exchanger 110 and out the exit conduit 130.

From the evaporator 115 of the third cooling stage the gaseous mixture is conducted through conduit 116 into a secondary heat exchanger 117 of the fourth cooling stage, wherein it is further cooled by ram air drawn through the exchanger by the fan 127, as previously explained.

Leaving the secondary heat exchanger 117 of the fourth cooling stage, the gaseous mixture passes through a conduit 118 and into a reheater 119 of the fifth cooling stage where it passes in heat exchange with a cool expanded gaseous mixture leaving the expansion turbine 121.

For water removal in our third embodiment, there are provided two water traps, the first 116a located in the conduit 116 leaving the evaporator of the third cooling stage, and the second 118a located in the conduit 118 leaving the secondary heat exchanger of the fourth cooling stage. Under the temperature and humidity conditions existing for the gaseous mixture at these points the traps serve to remove a considerable quantity of water. If necessary, water removal may be effected in a like manner at various other stages in the system as well. The water leaves the trap 118a through a drain 132, and leaves the trap 116a through a drain 133. Water from both drains then passes into a pipe 134 and then to the evaporator 115 of the third cooling stage to be treated in the manner previously described.

The gaseous mixture with a substantial amount of water removed leaves the reheater 119 of the fifth cooling stage and passes through the conduit 120 and into the expansion turbine 121 of the sixth cooling stage where it is still further cooled.

The method for providing the necessary transfer of energy obtained in the expansion of the gaseous mixture in the turbine 121 is the same as that described for our first and second embodiments; the turbine 121 being made to drive the blower 131, for recirculating cooled gases back to the combustion chamber 102, and to drive the fan 127, for recirculating ram air through the first cooling stage of the primary heat exchanger 110.

The expanded gaseous mixture leaving the expansion turbine 121 now passes through the reheater 119 of the fifth cooling stage where, as previously noted, it serves to cool slightly the warmer gases before they pass to the expansion turbine 121. In so doing the expanded gaseous mixture is itself heated slightly and any remaining moisture is removed by evaporation. It is then delivered at a proper temperature and in a dry state to the spaces to be inerted.

Therefore, while there are shown and described in this application only three of the forms which the invention may assume in practice, it will be understood that these forms are shown for purposes of illustration only and that the invention may be modified in various other forms without departing from its spirit.

We claim:

1. The method of inerting spaces comprising the steps of: burning compressed air and a fuel to produce a moisture laden inert gaseous mixture at a high temperature and pressure; cooling said moisture laden inert gaseous mixture by heat exchange in one or more stages, removing a portion of said moisture, further cooling said gaseous mixture by expansion, and thereafter removing substantially all remaining moisture to produce a dry inert gaseous mixture at a relatively low temperature and pressure.

2. In a continuous method for inerting spaces in aircraft wherein compressed air and a fuel are burned to produce a moisture laden inert gaseous mixture at a high temperature and pressure, the steps of passing ram air in heat exchange with said moisture laden inert gaseous mixture in at least one stage of the method; re-using said ram air at least once; passing cooled gases produced in later stages of the method into regenerative heat exchange with warmer gases in earlier stages of the method; removing said moisture and recirculating it for evaporative cooling, expanding said gaseous mixture in a work extraction engine in at least one cooling stage of the method; and employing the work extracted in said expansion for circulating ram air and recirculating cooled gases.

3. The method of inerting spaces comprising the steps of: burning a mixture of compressed air and fuel to produce a moisture laden inert gaseous mixture at a high temperature and pressure; cooling said moisture laden gaseous mixture by heat exchange to reduce said high temperature; mixing a portion of said cooled gaseous mixture with said high temperature gaseous mixture; further cooling and reducing the high pressure of another portion of said gaseous mixture by expansion; and thereafter removing the moisture from said other portion to produce a dry inert gaseous mixture at a relatively low temperature and pressure.

4. The method of inerting spaces comprising the steps of: burning a mixture of compressed air and a fuel to produce a moisture laden inert gaseous mixture at a high temperature and pressure; passing said moisture laden inert gaseous mixture through a plurality of cooling stages to reduce said high temperature; further cooling and reducing the high pressure of said gaseous mixture; thereafter removing a portion of said moisture to produce a relatively dry inert gaseous mixture at a relatively low temperature and pressure; and evaporating moisture remaining in said relatively dry inert gaseous mixture by passing said gaseous mixture in regenerative heat exchange with a warmer portion of said gaseous mixture.

5. The method of inerting spaces comprising the steps of: burning a mixture of compressed air and a fuel to produce a moisture laden inert gaseous mixture at a high temperature and pressure; cooling said moisture laden gaseous mixture to reduce said high temperature; separating said cooled gaseous mixture into two portions and mixing one portion with said high temperature gaseous mixture; thereafter further reducing the temperature and high pressure of the other portion of said gaseous mixture; and removing said moisture by condensation to produce a dry inert gaseous mixture at a relatively low temperature and pressure.

6. The method of inerting spaces comprising the steps of: burning a mixture of compressed air and a fuel to produce a moisture laden inert gaseous mixture at a high temperature and pressure; passing said moisture laden inert gaseous mixture through a plurality of cooling stages to reduce said high temperature; mixing a portion of said cooled gaseous mixture with said high temperature gaseous mixture; further cooling and reducing the high pressure of another portion of said gaseous mixture; thereafter removing a portion of said moisture to produce a relatively dry inert gaseous mixture at a relatively low temperature and pressure; and volatizing the water remaining in said relatively dry inert gaseous mixture by passing said gaseous mixture in regenerative heat exchange with a warmer portion of said gaseous mixture.

7. The method of inerting spaces comprising the steps of: burning a mixture of compressed air and a fuel to produce a moisture laden inert gaseous mixture at a high temperature and pressure; passing ram air in heat exchange with said moisture laden inert gaseous mixture to reduce said high temperature; further cooling and reducing the high pressure of said gaseous mixture, thereafter removing a portion of said moisture to produce a relatively dry inert gaseous mixture at a relatively low temperature and pressure; and volatilizing the water remaining in said relatively dry inert gaseous mixture by passing said gaseous mixture in regenerative heat exchange with a warmer portion of said gaseous mixture.

8. The method of inerting spaces comprising the steps of: burning a mixture of compressed air and a fuel to produce a moisture laden inert gaseous mixture at a high temperature and pressure; passing ram air in heat exchange with said moisture laden inert gaseous mixture to reduce said high temperature; mixing a portion of said cooled gaseous mixture with said high temperature gaseous mixture; further cooling and reducing the high pressure of another portion of said gaseous mixture by work extraction, thereafter removing a portion of said moisture to produce a relatively dry inert gaseous mixture at a relatively low temperature and pressure; and volatizing the water remaining in said relatively dry inert gaseous mixture by passing said gaseous mixture in regenerative heat exchange with a warmer portion of said gaseous mixture.

9. The method of inerting spaces comprising the steps of: burning a mixture of compressed air and a fuel to produce a moisture laden inert gaseous mixture at a high temperature and pressure; passing ambient air in heat exchange with said moisture laden inert gaseous mixture; further cooling and reducing the high pressure of said gaseous mixture by expansion, thereafter removing a portion of said moisture to produce a relatively dry inert gaseous mixture at a relatively low temperature and pressure; volatilizing the water remaining in said relatively dry inert gaseous mixture by passing said gaseous mixture in regenerative heat exchange with a warmer portion of said gaseous mixture; and employing the energy produced by said expansion for circulating said ambient air.

10. The method of producing a low temperature, low pressure, inert, substantially dry purge gas useful for inerting spaces which comprises (1) burning a mixture of compressed air and fuel to produce a high pressure, high temperature moisture laden first gaseous mixture, (2) partially cooling by heat exchange said high pressure, high temperature, moisture laden first gaseous mixture, (3) thereafter expanding and further cooling said first gaseous mixture to produce a low pressure, low temperature second gaseous mixture, (4) thereafter removing substantially all of the remaining moisture from said low pressure, low temperature second gaseous mixture, and (5) thereafter passing said low pressure, low temperature second gaseous mixture in regenerative heat exchange with a warmer portion of said first gaseous mixture to volatilize any water remaining therein.

References Cited in the file of this patent

UNITED STATES PATENTS

| Number | Name | Date |
|---|---|---|
| 283,996 | Garfield | Aug. 28, 1883 |
| 1,254,582 | Decker | Jan. 22, 1918 |
| 1,356,888 | Shea | Oct. 26, 1920 |
| 1,849,932 | Johnson | Mar. 15, 1932 |
| 1,984,665 | Tone | Dec. 18, 1934 |
| 2,051,125 | Bacon | Aug. 18, 1936 |
| 2,085,584 | Haskell | June 29, 1937 |
| 2,093,379 | Wellenborg | Sept. 14, 1937 |
| 2,130,163 | Tiddy et al. | Sept. 13, 1938 |
| 2,218,281 | de Ridder et al. | Oct. 15, 1940 |
| 2,542,194 | Hannum | Feb. 20, 1951 |
| 2,615,795 | Peck et al. | Oct. 28, 1952 |